United States Patent [19]

Aoki et al.

[11] Patent Number: 4,879,343

[45] Date of Patent: Nov. 7, 1989

[54] HEAT AND IMPACT RESISTANT RESIN COMPOSITION

[75] Inventors: Yuji Aoki, Yokkaichi; Hiroaki Miyazaki, Suzuka, both of Japan

[73] Assignee: Mitsubishi Monsanto Chemical Company, Tokyo, Japan

[21] Appl. No.: 243,338

[22] PCT Filed: Dec. 1, 1987

[86] PCT No.: PCT/JP87/00931

§ 371 Date: Aug. 5, 1988

§ 102(e) Date: Aug. 5, 1988

[87] PCT Pub. No.: WO88/04309

PCT Pub. Date: Jun. 16, 1988

[30] Foreign Application Priority Data

Dec. 11, 1986 [JP] Japan ................................. 61-295592
Feb. 19, 1987 [JP] Japan ................................. 62-36574

[51] Int. Cl.$^4$ ...................... C08L 51/04; C08L 55/02; C08L 79/08
[52] U.S. Cl. ........................................ 525/71; 525/74; 525/77; 525/80; 525/86
[58] Field of Search .................. 525/71, 74, 77, 80, 525/86

[56] References Cited

U.S. PATENT DOCUMENTS 3,766,142 10/1973 Nield et al. ...................... 560/474 A
4,151,224 4/1979 Hendy et al. ................... 560/876 R

FOREIGN PATENT DOCUMENTS 0216524 4/1987 European Pat. Off. .
2107794 5/1972 France .
2141432 12/1984 United Kingdom .

*Primary Examiner*—Allan M. Lieberman

*Attorney, Agent, or Firm*—Oblon, Spivak, McClelland, Maier & Neustadt

[57] ABSTRACT

A heat and impact resistant composition comprising:
 (A) 5-89 parts by weight of a graft polymer prepared by graft polymerizing 30-75 parts by weight of a mixture of 30-80% of an aromatic vinyl monomer, 10-50% of an N-substituted maleimide monomer, 10-45% of a vinyl cyanide monomer and 0-30% of another copolymerizable vinyl monomer onto 25-70 parts by weight of a diene rubber (a);
 (B) 10-90 parts by weight of a copolymer obtained by polymerizing a mixture of 30-80% of an aromatic vinyl monomer, 10-50% of an N-substituted maleimide monomer, 10-40% of a vinyl cyanide monomer and 0-30% of another copolymerizable vinyl monomer, or (B') an imido group—containing adduct of a copolymer obtained by reacting a primary amine and/or ammonia with a copolymer obtained by polymerizing a mixture of 30-80% of an aromatic vinyl monomer, 5-50% of an alpha, beta-unsaturated dicarboxylic acid anhydride monomer and 0-40% of another copolymerizable vinyl monomer;
 (C) 1-45 parts be weight of a graft polymer made by graft polymerizing 83-98 parts by weight of a mixture of 55-85% of an aromatic vinyl monomer and 15-45% of a vinyl cyanide monomer onto 2-17 parts by weight of a diene rubber (c);
 (D) 0-50 parts by weight of a copolymer obtained by polymerizing a mixture of 55-85% of an aromatic vinyl monomer and 15-45% of a vinyl cyanide monomer, provided that the total of (A), (B) or (B'), (C) and (D) is 100 parts by weight, and also provided that the total weight of monomers in each of (A), (B) or (B'), (C) and (D) is 100%.

12 Claims, No Drawings

HEAT AND IMPACT RESISTANT RESIN COMPOSITION

TECHNICAL FIELD

The present invention relates to a heat and impact resistant resin composition. More particularly, it relates to a resin composition obtained by incorporating an ABS resin to a rubber-modified resin prepared by graft-copolymerizing an N-substituted maleimide-containing monomer to a conjugated diene rubber, which is capable of providing a molded product having excellent heat and impact resistance.

BACKGROUND ART

It is well known to blend a rubber with a hard resin to obtain an impact resistant resin-modified with the rubber. An ABS resin is a typical resin of this type. However, since the heat resistance of the acrylonitrile-styrene copolymer (AS resin) as the hard resin is inadequate, it has been desired to have a hard resin having a higher heat deflection temperature.

As a styrene resin having high heat deflection temperature, for example, a copolymer of an N-substituted maleimide monomer with an aromatic vinyl monomer is known (L. E. Coleman et al., J. Polymer Sci., Vol. 38, p. 241, 1959). Further, a graft copolymer obtained by grafting a monomer mixture comprising an N-allyl-substituted maleimide, an aromatic vinyl monomer and acrylonitrile to a conjugated diene rubber and a resin composition containing such a graft copolymer have been proposed (U.S. Pat. No. 3,652,726).

However, the copolymer of an N-substituted maleimide monomer with a vinyl monomer tends to be brittle as the N-substituted maleimide monomer content increases, although the heat deflection temperature may thereby be made high. In order to overcome the brittleness, it has been proposed to blend an ABS resin (Japanese Unexamined Patent Publications Nos. 98536/1982 and 131213/1982), but such a proposal is still not satisfactory.

In order to improve the impact resistance of such a composition comprising an N-substituted maleimide styrene copolymer and an ABS resin, it is necessary to increase the amount of the ABS resin in the composition or to increase the proportion of the graft rubber in the ABS resin to be blended. On the other hand, the mechanical properties such as heat resistance and rigidity deteriorate with an increase of the amount of the ABS resin or with an increase of the proportion of the graft rubber in the ABS resin. Therefore, it is desired to develop a resin composition of an N-substituted maleimide-styrene copolymer which is excellent in both the heat resistance and the impact resistance.

DISCLOSURE OF THE INVENTION

The present inventors have conducted extensive research with an aim to solve the above-mentioned various drawbacks inherent to the conventional rubber-modified resin compositions comprising a copolymer of an N-substituted maleimide monomer and a vinyl monomer and have finally arrived at the present invention. Namely, it is an object of the present invention to provide a resin composition capable of providing a molded product having excellent heat and impact resistance, particularly remarkably improved dart impact strength, by blending a graft copolymer obtained by graft polymerizing a monomer mixture containing an N-substituted maleimide monomer to a conjugated diene rubber, with an ABS resin having a certain specific rubber particle size.

The present invention provides a heat and impact resistant resin composition which comprises:

(i) from 5 to 89 parts by weight of a graft copolymer resin (A) obtained by graft polymerizing from 30 to 75 parts by weight of a monomer mixture comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of other vinyl monomer copolymerizable with these monomers (provided that the total amount of the monomer mixture is 100% by weight) onto from 25 to 70 parts by weight of a conjugated diene rubber (a);

(ii) from 10 to 90 parts by weight of a copolymer resin (B) obtained by polymerizing a monomer mixture comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of other vinyl monomer copolymerizable with these monomers (provided that the total amount of the monomer mixture is 100% by weight), or an imido group-containing copolymer resin (B') obtained by reacting a primary amine and/or ammonia to a copolymer obtained by polymerizing a monomer mixture comprising from 30 to 80% by weight of an aromatic vinyl monomer, from 5 to 50% by weight of an α, β-unsaturated dicarboxylic acid anhydride monomer and from 0 to 40% by weight of other vinyl monomer copolymerizable with these monomers (provided that the total amount of the monomer mixture is 100% by weight);

(iii) from 1 to 45 parts by weight of a graft copolymer resin (C) obtained by graft polymerizing from 83 to 98 parts by weight of a monomer mixture comprising from 55 to 85% by weight of an aromatic vinyl monomer and from 15 to 45% by weight of a vinyl cyanide monomer (provided that the total amount of the monomer mixture is 100% by weight) onto from 2 to 17 parts by weight of a conjugated diene rubber (c); and (iv) from 0 to 50 parts by weight of a copolymer resin (D) obtained by polymerizing a monomer mixture comprising from 55 to 85% by weight of an aromatic vinyl monomer and from 15 to 45% by weight of a vinyl cyanide monomer (provided that the total amount of the monomer mixture is 100% by weight), provided that the total amount of the copolymer resins (A), (B) or (B'), (C) and (D) is 100 parts by weight.

DETAILED DESCRIPTION OF THE INVENTION

Now, the present invention will be described in detail.

The graft copolymer resin (A) included in the resin composition of the present invention is obtained by graft polymerizing from 30 to 75 parts by weight of a monomer mixture (I) comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of other vinyl monomer (i) copolymerizable with these monomers (provided that the total amount of the monomer mixture is 100% by weight) onto from 25 to 70 parts by weight of a conjugated diene rubber (a). This graft copolymer resin (A) is an impact resistant resin having excellent heat resistance, since it contains an N-substituted maleimide monomer component.

The conjugated diene rubber (a) as the substrate of the graft copolymer resin (A) is a rubbery polymer containing at least 50% by weight of a conjugated diene monomer component such as butadiene, isoprene or chloroprene and having a glass transition temperature of not higher than 0° C. Specific examples of such a conjugated diene rubber (a) include known synthetic rubbers such as butadiene rubber (BR), styrene butadiene rubber (SBR), acrylonitrile butadiene rubber (NBR) and isoprene rubber (IR).

This conjugated diene rubber (a) preferably has an average particle size within a range of from 0.1 to 0.5 μm in its latex form as dispersed in water. If the average particle size is less than 0.1 μm, no adequate improvement in the impact resistance will be observed in the resulting graft copolymer resin. If the average particle size exceeds 0.5 μm, emulsion graft polymerization tends to be difficult, and the stability of the rubber latex tends to deteriorate.

In the present invention, the average particle size of e.g. a conjugated diene rubber dispersed in water is meant for a weight average particle size as measured in a system of latex dispersed in water of 23° C. by Coulter ® Nano-Sizer TM manufactured by Coulter Electronics Ltd.

Specific examples of the aromatic vinyl monomer as a component of the above monomer mixture (I) include styrene, an α-alkylstyrene such as α-methylstyrene, a ring-substituted alkylstyrene such as p-methylstyrene and vinyl naphthalene. These monomers may be used alone or in combination as a mixture of two or more.

The proportion of the aromatic vinyl monomer in the monomer mixture (I) is from 30 to 80% by weight. If the proportion exceeds 80% by weight, the heat resistance of the resulting resin tends to be poor, or the compatibility with other hand resin tends to be inferior. If the proportion is less than 30% by weight, the properties of the graft polymerized resin tend to change, whereby the type of other copolymer resin to be blended will be limited, such being undesirable.

The N-substituted maleimide monomer may be at least one monomer selected from the group consisting of maleimide, N-phenylmaleimide, N-(o-methylphenyl)maleimide, N-(m-methylphenyl)maleimide, N-(p-methylphenyl)maleimide and N-cyclohexylmaleimide. Among them, N-phenylmaleimide is particularly preferred.

The N-substituted maleimide monomer is contained in the monomer mixture (I) in an amount within a range of from 10 to 50% by weight. If the content exceeds 50% by weight, the copolymer resin tends to be non-uniform, whereby the desired graft copolymer resin will hardly be obtained. If the content is less than 10% by weight, the heat resistance will be inadequate, and no adequate effect by the copolymerization of the N-substituted maleimide monomer will be obtained.

Specific examples of the vinyl cyanide monomer include acrylonitrile and methacrylonitrile. These monomers may be used alone or in combination as a mixture of two or more. The proportion of the vinyl cyanide monomer in the monomer mixture (I) must be within a range of from 10 to 40% by weight. If the proportion is outside this range, the compatibility of the graft polymerized resin and other copolymer resin will be poor, or the mechanical properties and the chemical resistance of a molded product obtained from the resulting composition tend to be poor.

As other monomer (i) copolymerizable with these monomers, an acrylate such as methyl acrylate, a methacrylate such as methyl methacrylate or a mixture thereof may be mentioned. Such a vinyl monomer (i) copolymerizable with these monomers is contained in the monomer mixture (I) in an amount of not higher than 30% by weight. If the amount exceeds 30% by weight, not only the reaction condition for the graft polymerization will have to be changed, but also the physical properties of the graft polymerized resin will be changed, such being undesirable.

The graft copolymer resin (A) in the present invention is prepared by mixing the above monomer mixture (I) with from 25 to 70 parts by weight of the above conjugated diene rubber (a) in an amount within a range of from 30 to 75 parts by weight and polymerizing the mixture for graft polymerization. If the proportions in parts by weight of the conjugated diene rubber (a) and the monomer mixture (I) are outside the above ranges, it will be likely that the copolymer of the monomer mixture (I) can not cover the surface of the conjugated diene rubber particles, or the proportion of the conjugated diene rubber in the graft copolymer resin will be too small, such being undesirable.

For this graft polymerization, an emulsion polymerization method, a suspension polymerization method, a solution polymerization method or a bulk polymerization method may be employed. When an emulsion polymerization method is employed, it may be conducted by a usual emulsion polymerization method wherein water is used as the medium. In such a case, it is preferred to add to the polymerization system the monomer mixture (I), a chain transfer agent, an emulsifier and a polymerization initiator in suitable divided portions as time passes, depending upon the polymerization degree of the emulsion polymerization.

If the graft polymerization is continued by a method other than the emulsion polymerization method, it is advisable that firstly the surface of the conjugated diene rubber particles is covered with a hard resin so that the rubber particles can be dispersed by themselves, and then the emulsion system is changed to a suspension system, a solution system or a bulk polymerization system to continue the graft polymerization.

After the completion of the graft polymerization, the polymerization system is subjected to a suitable combination of known after-treatments, such as salting out, separation, washing, drying, mixing and pelletizing, to obtain a graft copolymer resin (A).

The copolymer resin (B) included in the resin composition of the present invention is obtained by polymerizing a monomer mixture (II) comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of other vinyl monomer (ii) copolymerizable with these monomers. The copolymer resin (B) is a thermoplastic hard resin having excellent heat resistance, since it contains an N-substituted maleimide monomer component.

The aromatic vinyl monomer, the N-substituted maleimide monomer, the vinyl cyanide monomer and other vinyl monomer (ii) copolymerizable with these monomers, as the components constituting the above copolymer resin (B) are the same as the respective vinyl monomers described above as the components of the monomer mixture (I). The proportions of the respective vinyl monomers in the monomer mixture (II) are within the same ranges as the ranges defined with respect to the above monomer mixture (I). However, the composition of the monomer mixture (II) may only be required to be within the above ranges and may not necessarily be identical with the composition of the monomer mixture (I).

The molecular weight and the composition of the copolymer resin (B) are suitably selected so that a molded product obtainable from the resin composition of the present invention will have excellent heat and impact resistance as desired.

The polymerization method and the polymerization condition for the above monomer mixture (II) can suitably be selected from a batch or continuous system of an emulsion polymerization method, a suspension polymerization method, a solution polymerization method or a bulk polymerization method in accordance with a conventional production technique for e.g. an acrylonitrile-styrene copolymer (AS resin).

The polymerization of this monomer mixture (II) can be conducted simultaneously and in the same polymerization system as in the graft polymerization of the graft copolymer resin (A). However, it is usually preferred to conduct it separately under a separate polymerization condition.

The copolymer resin (B') which may be used in substitution for the copolymer resin (B) for preparing the resin composition of the present invention is obtained by reacting a primary amine and/or ammonia with a copolymer (precursor) obtained by polymerizing a monomer mixture (II') comprising from 30 to 80% by weight of an aromatic vinyl monomer, from 5 to 50% by weight of an α, β-unsaturated dicarboxylic acid anhydride monomer and from 0 to 40% by weight of other vinyl monomer (ii') copolymerizable with these monomers, for imidization. The copolymer resin (B') is a thermoplastic hard resin having excellent heat resistance, since it contains an N-substituted maleimide group component.

The aromatic vinyl monomer as a component constituting the copolymer as the precursor of the above copolymer resin (B') is the same as the aromatic vinyl monomer described above as a component of the monomer mixture (I). As the α,β-unsaturated dicarboxylic acid anhydride monomer, maleic anhydride may be mentioned. As other monomer (ii') copolymerizable with these monomers, a vinyl cyanide monomer such as acrylonitrile or methacrylonitrile, an acrylate such as methyl acrylate, a methacrylate such as methyl methacrylate and an N-substituted maleimide may be mentioned. These monomers may be used alone or in combination as a mixture of two or more. The proportion of the respective vinyl monomers in the monomer mixture (II') are as mentioned above. If the proportions are outside the above ranges, the properties of the copolymer and the copolymer resin (B') derived therefrom will change, whereby a desired resin composition will be hardly obtainable.

The polymerization method and the polymerization condition for the above monomer mixture (II') can suitably be selected from a batch or continuous system of a solution polymerization or a bulk polymerization. The copolymer as the precursor thus obtained is reacted with a primary amine and/or ammonia to obtain a copolymer resin (B') having imido groups. (For the details of the method for the production, see e.g. Japanese Unexamined Patent Publication No. 131213/1982.)

The primary amine and/or ammonia useful for the imidization reaction may be ammonia, an aliphatic primary amine such as a monoalkylamine or monocycloalkylamine having from 1 to 10 carbon atoms or an aromatic primary amine such as aniline or toluidine. These compounds may be used alone or in combination as a mixture of two or more.

The primary amine and/or ammonia is converted to an amido group by the reaction with the α,β-unsaturated dicarboxylic acid anhydride monomer component constituting the copolymer, which is then converted to an imido group when heated at a temperature higher than room temperature. The imidization reaction may be conducted after the production of the copolymer as the precursor, continuously in the same reactor, or may be conducted by withdrawing the copolymer from the polymerization system and purifying it, and then conducting the reaction in a separate reactor.

The copolymer after the completion of the imidization reaction may be subjected to conventional after-treatments to obtain a copolymer resin (B').

The graft copolymer resin (C) included in the resin composition of the present invention is obtained by graft polymerizing from 83 to 98 parts by weight of a monomer mixture (III) comprising from 55 to 85% by weight of an aromatic vinyl monomer and from 15 to 45% by weight of a vinyl cyanide onto to from 2 to 17 parts by weight of a conjugated diene rubber (c). The graft copolymer resin (C) is one of acrylonitrile-butadiene-styrene copolymers (ABS resins), and it is a thermoplastic resin having excellent impact resistance.

The average particle size of the graft rubber of the conjugated diene rubber (c) constituting this graft copolymer resin (C) is preferably within a range of more than 0.5 μm and not more than 5 μm. If the average particle size departs from this range, there will be no substantial improvement in the impact resistance of the resin composition obtained by the combination with the graft copolymer resin (A), such being undesirable. In order to increase the impact resistance particularly effectively, it is particularly preferred to select the average particle size of the graft rubber of the graft copolymer resin (C) within a range of from 0.7 to 4 μm.

In the present invention, the average particle size of the graft rubber of the conjugated diene rubber component is meant for a weight average particle size as measured in a solution obtained by dissolving a small amount of the graft copolymer in dimethylformamide and adding a trace amount of potassium thiocyanate, at 23° C., using a Coulter Counter Model TA II manufactured by Coulter Electronics Limited, U.S.A.

The conjugated diene rubber (c) as the substrate of the above graft copolymer resin (C) is a rubbery polymer containing at least 50% by weight of a conjugated diene monomer component such as butadiene, isoprene or chloroprene and having a glass transition temperature of not higher than 0° C. Specific examples of the conjugated diene rubber (c) include butadiene rubber (BR), styrene-butadiene rubber (SBR), acrylonitrile-butadiene rubber (NBR) and isoprene rubber (IR).

The aromatic vinyl monomer and the vinyl cyanide monomer as components of the above monomer mixture (III) are the same as the respective vinyl monomers described above as the components used for the preparation of the graft copolymer resin (A). The monomer mixture (III) comprises from 55 to 85% by weight of the aromatic vinyl monomer and from 15 to 45% by weight of the vinyl cyanide monomer. If the composition departs from these ranges, the properties of the graft polymerized resin will change, whereby the compatibility with other copolymer resins to be blended will be inferior, and the heat resistance or impact resistance of the resulting resin composition tends to be low, such being undesirable.

This monomer mixture (III) is added to from 2 to 17 parts by weight of the above-mentioned conjugated diene rubber (c) in an amount within the range of from 83 to 98 parts by weight, followed by graft polymerization. If the amount of the monomer mixture (III) to be added is less than 83 parts by weight and the amount of the conjugated diene rubber (c) exceeds 17 parts by weight, it tends to be difficult to conduct graft polymerization while maintaining the particle size of the graft rubber within the above-mentioned range, and the surface appearance of the graft copolymer tends to deteriorate, such being undesirable. If the amount of the monomer mixture (III) exceeds 98 parts by weight and the amount of the conjugated diene rubber (c) is less than 2 parts by weight, there will be an increase of the resin not graft-polymerized, and the concentration of the conjugated diene rubber component in the graft copolymer resin tends to be low, such being undesirable.

This graft polymerization may be conducted in a batch or continuous system by a conventional method such as a bulk polymerization method, a solution polymerization method, a suspension polymerization method and/or an emulsion polymerization method in a proper combination. For instance, in a combination of the bulk and suspension polymerization methods, firstly a solution system is formed in which the conjugated diene rubber is completely dissolved in the monomer mixture, and the polymerization is conducted while exerting a shearing stress. Then, after the graft rubber particles are formed under a stabilized condition, the system is changed to a suspension polymerization to complete the polymerization and to recover unreacted monomers.

In this graft polymerization, a polymerization initiator known for an acrylonitrile-rubber component-styrene copolymer and, if necessary, additives such as a chain transfer agent, an antioxidant, a surfactant and a suspending agent, may be used in a suitable combination.

The copolymer resin (D) constituting the composition of the present invention is obtained by polymerizing a monomer mixture (IV) comprising from 55 to 85% by weight of an aromatic vinyl monomer and from 15 to 45% by weight of a vinyl cyanide monomer. This copolymer resin (D) is a known acrylonitrile-styrene copolymer (AS resin) having a molecular weight and composition suitable for the resin composition of the present invention.

The polymerization method and the polymerization condition for the above monomer mixture (IV) can suitably be selected from a batch or continuous system of a method such as an emulsion polymerization method, a suspension polymerization method, a solution polymerization method or a bulk polymerization method in accordance with a known technique for the preparation of an AS resin. The aromatic vinyl monomer and the vinyl cyanide monomer as components of the monomer mixture (IV) are the same as the respective vinyl monomers described above with respect to the monomer mixture (I).

The proportions of the respective vinyl monomers in the monomer mixture (IV) are within the same ranges as defined with respect to the above monomer mixture (III). However, the composition of the monomer mixture (IV) may only be required to be within the above ranges and may not necessarily be identical with the composition of the monomer mixture (III). If the proportions are outside these ranges, not only the polymerization condition will have to be modified, but also the type and the composition of other graft copolymer resins to be blended will be restricted, such being undesirable.

The polymerization of the monomer mixture (IV) to obtain the copolymer resin (D) can be conducted simultaneously or continuously in the same polymerization system as in the polymerization of the copolymer as the precursor of the copolymer resin (B') and/or the graft polymerization of the graft copolymer resin (C).

The resin composition of the present invention is prepared by mixing from 5 to 89 parts by weight of the above-mentioned graft copolymer resin (A), from 10 to 90 parts by weight of the copolymer resin (B) or (B'), from 1 to 45 parts by weight of the graft copolymer resin (C) and from 0 to 50 parts by weight of the copolymer resin (D), provided that the total amount of the copolymers (A), (B) or (B'), (C) and (D) is 100 parts by weight. It is preferred to further subject the mixture to a melt-kneading process. If the proportions of the respective copolymer resins are outside the above ranges, the desired heat resistance or impact resistance can not be obtained, and it is difficult to obtain a thermoplastic resin composition having good moldability.

In the preparation of the mixture, it is preferred to suitably select the combination so that the weight ratio of the conjugated diene rubber (a) for the graft copolymer resin (A) to the conjugated diene rubber (c) for the graft copolymer resin (C) is within a range of conjugated diene rubber (a)/conjugated diene rubber (c)=97/3 to 50/50. If the content of the conjugated diene rubber (c) is less or more than the above range for the ratio of the conjugated diene rubber (a) component to the conjugated diene rubber (c) component, the impact resistance tends to deteriorate. Therefore, it is advisable to select a suitable combination within the above range.

Further, it is preferred to prepare the mixture so that the total amount of the conjugated diene rubber (a) and the conjugated diene rubber (c) contained in the resin composition of the present invention is within a range of from 5 to 40% by weight relative to the entire resin composition. If the total amount of the conjugated diene rubber (a) and the conjugated diene rubber (c) is less than the above range, the impact resistance tends to deteriorate, and if the total amount exceeds the above range, the heat resistance, rigidity or melt-flowability of the resin composition tends to deteriorate, which adversely affects the surface appearance of a molded product. Therefore, it is advisable that the total amount is within the above range.

Conventional mixing and kneading methods may be employed for blending, mixing and kneading the graft copolymer resin (A), the copolymer resin (B) or (B'), the graft copolymer resin (C) and the copolymer resin (D). For example, a mixture of one or more kinds of these copolymer resins in the form of powder, beads, flakes or pellets may be mixed and kneaded by an extruder such as a single-screw extruder or a twin-screw extruder, or by a kneading machine such as a Banbury mixer, a pressure kneader or a twin roll mill, to obtain a resin composition. In some cases, it is possible to employ a method wherein one or mode kinds of these copolymer resins are mixed in undried state after the polymerization, followed by precipitation, washing, drying and kneading.

With respect to the order for this mixing and kneading, the four resin components may be simultaneously mixed and kneaded, or one or more resin components may firstly be mixed and kneaded and a separately kneaded mixture of one or more resin components may be added thereto, followed by kneading to obtain a desired resin composition.

If a volatile component remains in the resin composition, the heat resistance is likely to deteriorate. It is therefore preferred to conduct degassing by a vacuum vent or the like during the mixing and kneading by means of an extruder.

The resin composition of the present invention may be employed by itself or may be heated and dried for molding operation. Further, it may be blended and kneaded with other thermoplastic resins such as polystyrene, an AS resin, an ABS resin, polymethyl methacrylate, polyvinyl chloride, polycarbonate, polyamide, polybutylene terephthalate, polyphenylene oxide or an acrylonitrile-EPDM rubber-styrene copolymer (AES resin) for use as a heat and impact resistant resin.

Various resin additives such as a lubricant, a releasing agent, a plasticizer, a coloring agent, an antistatic agent, a flame retardant, a ultraviolet absorber, a light stabilizer, a heat stabilizer, a filler or a nucleating agent may be added in a suitable combination to the resin composition of the present invention in an amount and of the type not adversely affect the nature of the resin.

The resin composition of the present invention may be formed into shaped products such as automobile parts, electrical parts or industrial parts by various molding methods such as injection molding, extrusion molding or compression molding, which are useful for applications where excellent heat and impact resistance is required.

The present invention is as described above and provides the following remarkable effects, and its value for industrial application is significant.

(1) The resin composition of the present invention comprises the graft copolymer resin (A) and the copolymer resin (B), and has excellent heat resistance since these contain a proper amount of an N-substituted maleimide component.

(2) The resin composition of the present invention is useful as a thermoplastic resin having excellent impact resistance, since the proportions of the rubber components i.e. the conjugated diene rubber (a) in the graft copolymer resin (A) and the conjugated diene rubber (c) in the graft copolymer resin (C), the total amount of the rubber components and the particle sizes of the rubber components are adjusted, respectively, to the most suitable levels.

(3) The resin composition of the present invention has excellent moldability and chemical resistance as a kind of ABS resins, since it contains the graft copolymer resin (C) and the copolymer resin (D).

(4) The resin composition of the present invention has excellent compatibility with other hard thermoplastic resins. Therefore, it can be mixed and kneaded with such other resins to prepare a different type of resin composition having excellent heat and impact resistance.

Now, the present invention will be described in further detail with reference to Examples. However, it should be understood that the present invention is by no means restricted to such specific Examples. In the following Examples, "parts" means "parts by weight".

PREPARATION EXAMPLE 1

(1) Preparation of graft copolymer resin (A)

A monomer mixture (I) comprising 45 parts of styrene (hereinafter referred to simply as St), 30 parts of N-phenylmaleimide (hereinafter referred to simply as N-PMI), 25 parts of acrylonitrile (hereinafter referred to simply as AN) and 0.6 part of terpinolene (chain transfer agent).

Into a glass flask equipped with a stirrer, a refluxing condenser, a thermometer and an additive supply device, 333 parts (inclusive of water) of a styrene-butadiene-rubber latex (St content: 10% by weight, rubber solid content: 30% by weight, rubber particle size: 0.30 μm) and 150 parts of deionized water were charged, and the internal temperature was raised to 80° C. under a nitrogen stream under stirring.

Then, into this flask, 2 parts of an aqueous solution of potassium persulfate (hereinafter referred to simply as KPS) (containing 0.1 part of KPS) was added over a period of 240 minutes, and the entire amount of the monomer mixture (I) was added over a period of 210 minutes, continuously, to initiate the polymerization at the same temperature. After 60 minutes and 180 minutes from the initiation of the polymerization, 0.2 part of sodium dodecylbenzene sulfonate was added to the polymerization system. The graft polymerization reaction was continued at the same temperature for 360 minutes from the initiation of the polymerization.

After the completion of the graft polymerization reaction, the latex obtained was dropwise added to a 4% magnesium sulfate aqueous solution heated to 95° C. for salting out, followed by dewatering and drying to obtain a maleimide graft copolymer resin (A) in a powder form.

(2) Preparation of copolymer resin (B)

Into a polymerization reactor equipped with a refluxing condenser, a stirrer and a monomer supply device, 100 parts of deionized water having 0.03 part of a polyvinyl alcohol-type suspending agent dissolved therein was charged. To this polymerization reactor, a monomer mixture comprising 30 parts of St, 15 parts of AN and 20 parts of N-PMI was further charged together with 0.4 part of terpinolene (chain transfer agent). The internal temperature was maintained at 60° C. under a nitrogen stream under stirring, and 0.06 part of α,α'-azobisisobutyronitrile was added as a polymerization initiator to initiate the polymerization reaction.

Then, immediately after the initiation of the polymerization reaction, a supply of the monomer mixture from the above monomer supply device to the polymerization reactor was initiated, and the rest of the monomer mixture comprising 15 parts of St, 10 parts of AN and 10 parts of N-PMI having 0.04 part of α,α'-azobisisobutyronitrile and 0.2 part of terpinolene added thereto was continuously added over a period of 120 minutes. Further, upon expiration of 15 minutes from the initiation of the polymerization reaction, 0.03 part of a polyvinyl alcohol-type suspending agent was added to the polymerization reactor, and after 30 minutes, 60 minutes, 90 minutes and 120 minutes from the initiation of the polymerization reaction, 0.0225 part of a polyvinyl alcohol-type suspending agent was added to the polymerization reactor. During this period, the temperature of the polymerization system was maintained at 60° C.

Upon expiration of 180 minutes from the initiation of the polymerization reaction, 0.03 part of an acrylic acid-2-ethylhexylacrylate copolymer (suspending agent) and 0.26 part of sodium sulfate were added to the polymerization reactor, and the temperature of the polymerization system was raised to 75° C. over a period of 30 minutes. The polymerization reaction was continued at 75° C. for 120 minutes. Then, the temperature of the polymerization system was raised to 80° C., and the polymerization reaction was conducted for 120 minutes while conducting stripping under a nitrogen gas stream. The resulting slurry of a copolymer resin was subjected to filtration, followed by dewatering and drying to obtain 86.5 parts by weight of a glanular maleimide copolymer resin.

To the maleimide copolymer resin thus obtained, stearyl-$\beta$-(3,5-di-t-butyl-4-hydroxyphenyl)propionate (antioxidant) and magnesium stearate (lubricant) were blended in an amount of 0.1 part, respectively, per 100 parts by weight of the copolymer resin, and the blend was kneaded by an extruder provided with a vent while degassing and then pelletized to obtain a copolymer resin (B).

(3) Preparation of graft copolymer resin (C)

In an autoclave equipped with an anchor-shaped stirrer, 155 parts of butadiene rubber (Diene NF-35, trade name, manufactured by Asahi Chemical Industry Co., Ltd.) was dissolved in a mixture of 211 parts of AN and 634 parts of St. Then, 0.13 part of tert-butyl peracetate, 0.5 part of di-tert-butyl peroxide and 0.7 part of a stabilizer mixture were added, and polymerization was initiated. The mixture was heated to 100° C. under a nitrogen atmosphere, and the polymerization was conducted under stirring at a rotational speed of 100 rpm. During this period, terpinolene was added at a rate of about 1 part per 60 minutes over a period of 300 minutes from the initiation of the polymerization, and finally 5 parts of terpinolene was additionally added.

When the conversion of the monomers reached about 30%, the polymerization mixture (syrup) was transferred to an autoclave (equipped with a stirrer having three vanes) containing an aqueous solution comprising 3 parts of a suspending agent (acrylic acid-2-ethylhexylacrylate copolymer) in 1,200 parts of deionized water. After flushing with nitrogen, this suspension system was polymerized at 130° C. (for 120 minutes) under stirring at a rotational speed of 500 rpm and then subjected to stripping at 150° C. for 60 minutes. The obtained resin was washed with water and dried to obtain about 990 parts of a graft copolymer resin (C). The average particle size of the rubber in this graft copolymer resin was about 1.9 $\mu$m.

(4) Copolymer resin (D)

An acrylonitrile-styrene copolymer (AS resin, SAN®-C, manufactured by Mitsubishi Monsanto Chemical Company) was used.

EXAMPLES 1 to 4 and COMPARATIVE EXAMPLES 1 to 2

The graft copolymer resin (A), the copolymer resin (B), the graft copolymer resin (C) and the copolymer resin (D) obtained in Preparation Example 1 were mixed in the proportions (parts) as identified in Table 1 and kneaded by a single-screw extruder while degassing from a vent to obtain pellets of a resin composition.

The pellets of this resin composition were molded by a thermoplastic resin injection molding machine into test pieces for the measurement of the physical properties. With respect to the molded test pieces, the tensile strength, the Izod impact strength (notched), the falling dart impact strength, the Vicat softening point and the melt flow rate were measured, respectively, in accordance with the methods as identified in Table 1. The results are shown in Table 1.

TABLE 1

| | | Examples | | | | Comparative Examples | |
|---|---|---|---|---|---|---|---|
| | | 1 | 2 | 3 | 4 | 1 | 2 |
| Proportions (parts) | Graft copolymer resin (A) | 30.6 | 35.7 | 30.6 | 30.6 | 0 | 36.0 |
| | Copolymer resin (B) | 52.0 | 44.0 | 39.0 | 26.0 | 0 | 64.0 |
| | Graft copolymer resin (C) | 17.4 | 20.3 | 17.4 | 17.4 | 100 | 0 |
| | Copolymer resin (D) | 0 | 0 | 13.0 | 26.0 | 0 | 0 |
| Physical properties | Tensile strength *1 (kg/cm$^2$) | 440 | 390 | 440 | 440 | 290 | 500 |
| | Izod impact strength *2 (kg · cm/cm) | 11 | 13 | 13 | 16 | 13 | 4 |
| | Falling dart impact strength (J) *3 | 10.8 | 14.7 | 12.7 | 14.7 | 14.7 | 1.8 or less |
| | Vicat softening point *4 (°C.) | 137 | 132 | 126 | 118 | 93 | 145 |
| | Melt flow rate *5 (g/10 min) | 1.2 | 1.1 | 2.7 | 4.9 | 24 | 1.1 |

The following are evident from Table 1.

(1) The resin compositions of the present invention have excellent heat resistance (see Examples 1 to 4) since the graft copolymer resin (A) and the copolymer resin (B) contain a proper amount of an N-substituted maleimide monomer.

Whereas, the graft copolymer resin (C) containing no N-substituted maleimide monomer component has low heat resistance (see Comparative Example 1).

(2) The resin compositions of the present invention have excellent impact resistance, particularly high falling dart impact strength (see Examples 1 to 4) since the proportions of the rubber components i.e. the conjugated diene rubber (a) in the graft copolymer resin (A) and the conjugated diene rubber (c) in the graft copolymer resin (C), the total amount of the respective rubber components and the respective rubber particle sizes are selected to be within the most suitable ranges.

Whereas, a resin composition obtained outside the ranges of the present invention is inferior in the impact resistance (see Comparative Example 2).

PREPARATION EXAMPLE 2

(1) Preparation of graft copolymer resin (A) and graft copolymer resin (C)

The graft copolymer resins (A) and (C) were prepared in the same manner as in Steps (1) and (3) of Preparation Example 1, respectively.

(2) Preparation of a mixture of copolymer resin (B') and copolymer resin (D)

Into an autoclave equipped with a condenser, a stirrer and a starting material and additive supply device, 690 parts of St and 19 parts of maleic anhydride were charged, and the polymerization system was flushed with nitrogen gas. The internal temperature of the polymerization reactor was raised to 95° C. under stirring, and the bulk polymerization reaction was initiated. Then, 100 parts of melted maleic anhydride heated to 70° C. was continuously added at a constant rate to the polymerization system at 95° C. over a period of 460 minutes after the initiation of the polymerization. After 460 minutes from the initiation of the polymerization, a viscous solution having a polymerization degree of 44% by weight was obtained.

To this polymerization system, 210 parts of AN was further continuously added during the period from 460 minutes to 480 minutes from the initiation of the polymerization. The temperature of the polymerization system was lowered from 95° C. to 90° C., and the bulk polymerization reaction was conducted for further 20 minutes, whereupon no substantial maleic anhydride remained in the unreacted monomers, thus showing that maleic anhydride was consumed by the polymerization reaction.

To this polymerization system, 700 parts of an aqueous solution containing 0.03 part of a poval-type suspending agent and 0.03 part of an acrylic acid-2-ethylhexylacrylate copolymer-type suspending agent and 2 parts of di-t-butylperoxide were added, and the polymerization system was changed from the bulk polymerization system to a suspension polymerization system. This suspension polymerization system was heated to 110° C., and the unreacted monomers were removed by stripping at the same temperature for 120 minutes. Then, 80 parts of AN was added thereto, and the temperature of the suspension polymerization system was raised from 110° C. to 150° C. over a period of 60 minutes. While maintaining the temperature of the suspension polymerization system at 150° C., stripping was conducted again for 120 minutes.

After the completion of the stripping, the suspension system was heated to 155° C., and 90 parts of aniline and 10 parts of 25 wt % aqueous ammonia were added thereto. The suspension system was stirred at the same temperature for 120 minutes to conduct the imidization reaction. The suspension system was cooled, followed by filtration, washing with water and drying to obtain a copolymer in the form of beads. The beads copolymer was pelletized by a single-screw extruder. The pellets were analyzed and found to be a mixture of a copolymer resin (B') comprising 58.8% by weight of a styrene component, 38.2% by weight of an N-phenylmaleimide component, 1.4% by weight of a maleimide component and 1.6% by weight of a maleic anhydride component and a copolymer resin (D) comprising 73.8% by weight of a styrene component and 26.2% by weight of an acrylonitrile component, the composition being 76% by weight of the copolymer resin (B') and 24% by weight of the copolymer resin (D).

EXAMPLES 5 to 7 and COMPARATIVE EXAMPLES 3 and 4

The graft copolymer resin (A), the mixture of the copolymer resins (B') and (D) and the graft copolymer resin (C) obtained in Preparation Example 2 were mixed in the proportions (parts) as identified in Table 2 and kneaded by a single-screw extruder while degassing from a vent to obtain pellets of a resin composition.

The pellets of this resin composition was formed by a thermoplastic resin injection molding machine into test pieces for the measurement of the physical properties. With respect to the molded test pieces, the tensile strength, the Izod impact strength (notched) at temperatures of 23° C. and −20° C., the falling dart impact strength, the Vicat softening point and the melt flow rate were measured, respectively. The results are shown in Table 2.

TABLE 2

|  |  | Examples | | | Comparative Examples | |
|---|---|---|---|---|---|---|
|  |  | 5 | 6 | 7 | 3 | 4 |
| Proportions (parts) | Graft copolymer resin (A) | 31.9 | 38.3 | 44.6 | 0 | 36.0 |
|  | Copolymer resin (B') | 40.7 | 33.7 | 26.7 | 0 | 48.6 |
|  | Graft copolymer resin (C) | 14.5 | 17.4 | 20.3 | 100 | 0 |
|  | Copolymer resin (D) | 12.9 | 10.6 | 8.4 | 0 | 15.4 |
| Physical properties | Tensile strength *1 (kg/cm$^2$) | 385 | 360 | 335 | 290 | 405 |
|  | Izod impact strength *2 |  |  |  |  |  |
|  | (kg · cm/cm) (23° C.) | 11 | 13 | 14 | 13 | 4 |
|  | (kg · cm/cm) (−20° C.) | 7 | 10 | 13 | 10 | 2 |
|  | Dart impact strength *3 (J) | 5 | 6 | 13 | 15 | 2 or less |
|  | Vicat softening point *4 (°C.) | 129 | 127 | 125 | 93 | 133 |
|  | Melt flow rate *5 (g/10 min) | 2.6 | 2.9 | 1.9 | 24 | 3.2 |

The following are evident from Table 2.

(1) The resin compositions of the present invention have excellent heat resistance (see Examples 5 to 7) since the graft copolymer resin (A) and the copolymer resin (B') contain a proper amount of an N-substituted maleimide monomer.

Whereas, the graft copolymer resin (C) containing no N-substituted maleimide monomer component has low tensile strength and heat resistance (see Comparative Example 3).

(2) The resin compositions of the present invention have excellent impact resistance, particularly high falling dart impact strength (see Examples 5 to 7) since the proportions of the rubber components i.e. the conjugated diene rubber (a) in the graft copolymer resin (A) and the conjugated diene rubber (c) in the graft copolymer resin (C), the total amount of the respective rubber components and the respective rubber particle sizes are selected to be within the most suitable ranges.

Whereas, a resin composition obtained outside the ranges of the present invention is inferior in the impact resistance (see Comparative Example 4).

We claim:

1. A heat and impact resistant resin composition which comprises:

(i) from 5 to 89 parts by weight of a graft copolymer resin (A) obtained by graft polymerizing from 30 to 75 parts by weight of a monomer mixture comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of another vinyl monomer copolymerizable with these monomers, provided that the total amount of the monomer mixture is 100% by weight, onto from 25 to 70 parts by weight of a conjugated diene rubber (a) which is a rubbery polymer containing at least 50% by weight of a conjugated diene monomer component and having a glass transition temperature of not higher than 0° C.;

wherein said conjugated diene rubber (a) has an average particle size within a range of from 0.1 to 0.5 μm in its latex form as dispersed in water;

wherein said N-substituted maleimide monomer is at least one monomer selected from the group consisting of maleimide, N-phenylmaleimide, N-(o-methylphenyl)maleimide, N-(m-methylphenyl)maleimide, N-(p-methylphenyl)maleimide and N-cyclohexylmaleimide;

(ii) from 10 to 90 parts by weight of a copolymer resin (B) obtained by polymerizing a monomer mixture comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of other vinyl monomer copolymerizable with these monomers, provided that the total amount of the monomer mixture is 100% by weight, or an imido group-containing copolymer resin (B′) obtained by reacting a primary amine or ammonia, or both, with a copolymer obtained by polymerizing a monomer mixture comprising from 30 to 80% by weight of an aromatic vinyl monomer, from 5 to 50% by weight of maleic anhydride and from 0 to 40% by weight of another vinyl monomer copolymerizable with these monomers, provided that the total amount of the monomer mixture is 100% by weight;

(iii) from 1 to 45 parts by weight of a graft copolymer resin (C) obtained by graft polymerizing from 83 to 98 parts by weight of a monomer mixture comprising from 55 to 85% by weight of an aromatic vinyl monomer and from 15 to 45% by weight of a vinyl cyanide monomer, provided that the total amount of the monomer mixture is 100% by weight, onto from 2 to 17 parts by weight of a conjugated diene rubber (c), wherein said conjugated diene rubber (c) is a rubbery polymer containing at least 50% by weight of a conjugated diene monomer component, having a glass transition temperature of not higher than 0° C., and an average particle size of more than 0.5 μm and not more than 5 μm; and (iv) from 0 to 50 parts by weight of a copolymer resin (D) obtained by polymerizing a monomer mixture comprising from 55 to 85% by weight of an aromatic vinyl monomer and from 15 to 45% by weight of a vinyl cyanide monomer, provided that the total amount of the monomer mixture is 100% by weight, and also provided that the total amount of the copolymer resins (A), (B) or (B,), (C) and (D) is 100 parts by weight, wherein the weight ratio of the conjugated diene rubber (a) for the graft copolymer resin (A) to the conjugated diene rubber (c) for the graft copolymer resin (C) is within a range of conjugated diene rubber (a)/conjugated diene rubber (c)=97/3 to 50/50, and wherein the total amount of the conjugated diene rubber (a) and the conjugated diene rubber (c) contained in the resin composition is within a range of 5 to 40% by weight relative to the entire resin composition.

2. The heat and impact resistant resin composition according to claim 1, wherein the conjugated diene rubber (a) has in its latex form an average particle size within a range of from 0.1 to 0.5 μm.

3. The heat and impact resistant composition according to claim 1, wherein the average particle size of graft rubber of the conjugated diene rubber (c) for the graft copolymer resin (C) is more than 0.5 μm and not more than 5 μm.

4. The heat and impact resistant resin composition according to claim 1, wherein the weight ratio of the conjugated diene rubber (a) for the graft copolymer resin (A) to the conjugated diene rubber (c) for the graft copolymer resin (C) is within a range of conjugated diene rubber (a)/conjugated diene rubber (c)=97/3 to 50/50.

5. The heat and impact resistant resin composition according to claim 1, wherein the total amount of the conjugated diene rubber (a) and the conjugated diene rubber (c) is within a range of from 5 to 40% by weight relative to the entire resin composition.

6. The heat and impact resistant resin composition of claim 1, wherein said conjugated diene rubber (a), as a component constituting the graft coplymer resin (A), is a rubbery polymer containing at least 50% by weight of butadiene, isoprene or chloroprene.

7. The heat and impact resistant resin composition of claim 1, wherein said N-substituted maleimide monomer is N-phenylmaleimide.

8. The heat and impact resistant resin composition of claim 1, wherein said conjugated diene rubber, (c), as a component constituting graft copolymer resin (C), is a rubbery polymer containing at least 50% by weight of butadiene, isoprene or chloroprene.

9. The heat and impact resistant resin composition of claim 1, wherein said conjugated diene rubber (a) is a butadiene rubber, a styrene butadiene rubber, an acrylonitrile butadiene rubber, or an isoprene rubber.

10. The heat and impact resistant resin composition of claim 1, wherein said vinyl cyanide monomer is acrylonitrile, methacrylonitrile, or a combination of the two.

11. A shaped product obtained from a heat and impact resistant resin composition which comprises:
(i) from 5 to 89 parts by weight of a graft copolymer resin (A) obtained by graft polymerizing from 30 to 75 parts by weight of a monomer mixture comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of other vinyl monomer copolymerizable with these monomers, provided that the total amount of the monomer mixture is 100% by weight, onto from 25 to 70 parts by weight of a conjugated diene rubber (a) which is a rubbery polymer containing at least 50% by weight of a conjugated diene monomer component and having a glass transition temperature of not higher than 0° C.;

wherein said conjugated diene rubber (a) has an average particle size within a range of from 0.1 to 0.5 μm in its latex form as dispersed in water;

wherein said N-substituted maleimide monomer is at least one monomer selected from the group consisting of maleimide, N-phenylmaleimide, N-(o-methylphenyl)maleimide, N-(m-methylphenyl)maleimide, N-(p-methylphenyl)maleimide and N-cyclohexylmaleimide;

(ii) from 10 to 90 parts by weight of a copolymer resin (B) obtained by polymerizing a monomer mixture comprising from 30 to 80% by weight of an aromatic vinyl monomer, from 10 to 50% by weight of an N-substituted maleimide monomer, from 10 to 40% by weight of a vinyl cyanide monomer and from 0 to 30% by weight of other vinyl monomer copolymerizable with these monomers, provided that the total amount of the monomer mixture is 100% by weight, or an imido group-containing copolymer resin (B') obtained by reacting a primary amine or ammonia, or both, with a copolymer obtained by polymerizing a monomer mixture comprising from 30 to 80% by weight of an aromatic vinyl monomer, from 5 to 50% by weight of maleic anhydride and from 0 to 40% by weight of other vinyl monomer copolymerizable with these monomers, provided that the total amount of the monomer mixture is 100% by weight;

(iii) from 1 to 45 parts by weight of a graft copolymer resin (C) obtained by graft polymerizing from 83 to 98 parts by weight of a monomer mixture comprising from 55 to 85% by weight of an aromatic vinyl monomer and from 15 to 45% by weight of a vinyl cyanide monomer, provided that the total amount of the monomer mixture is 100% by weight, onto to from 2 to 17 parts by weight of a conjugated diene rubber (c), wherein said conjugated diene rubber (c) is a rubbery polymer containing at least 50% by weight of a conjugated diene monomer component, having a glass transition temperature of not higher than 0° C., and an average particle size of more than 0.5 μm and not more than 5μm; and (iv) from 0 to 50 parts by weight of a copolymer resin (D) obtained by polymerizing a monomer mixture comprising from 55 to 85% by weight of an aromatic vinyl monomer and from 15 to 45% by weight of a vinyl cyanide monomer, provided that the total amount of the monomer mixture is 100% by weight, and also provided that the total amount of the copolymer resins (A), (B) or (B'), (C) and (D) is 100 parts by weight, wherein the weight ratio of the conjugated diene rubber (a) for the graft copolymer resin (A) to the conjugated diene rubber (c) for the graft copolymer resin (C) is within a range of conjugated diene rubber (a)/conjugated diene rubber (c)=97/3 to 50/50, and wherein the total amount of the conjugated diene rubber (a) and the conjugated diene rubber (c) contained in the resin composition is within a range of 5 to 40% by weight relative to the entire resin composition.

12. The shaped product of claim 11, wherein said product is an automobile part or an electrical part.

* * * * *